US007494059B2

(12) United States Patent
Chang

(10) Patent No.: US 7,494,059 B2
(45) Date of Patent: *Feb. 24, 2009

(54) CARD DISPENSER HAVING A MOBILE SENSOR HOLDER BOX

(75) Inventor: Hung-Yi Chang, Chilung (TW)

(73) Assignee: International Currency Technologies Corporation, Taipei (TW)

( * ) Notice: Subject to any disclaimer, the term of this patent is extended or adjusted under 35 U.S.C. 154(b) by 271 days.

This patent is subject to a terminal disclaimer.

(21) Appl. No.: 11/419,488

(22) Filed: May 19, 2006

(65) Prior Publication Data

US 2007/0267488 A1 Nov. 22, 2007

(51) Int. Cl.
*G06F 7/08* (2006.01)

(52) U.S. Cl. ........................ 235/381; 235/379; 235/475; 235/479

(58) Field of Classification Search ................. 235/379, 235/380, 381, 439, 475, 478, 479; 902/8, 902/13
See application file for complete search history.

(56) References Cited

U.S. PATENT DOCUMENTS 7,051,926 B2 * 5/2006 Saltsov et al. ............... 235/379
7,309,005 B2 * 12/2007 Washington et al. ........ 235/379
2003/0085510 A1 * 5/2003 Abe et al. ................... 271/171

FOREIGN PATENT DOCUMENTS

GB 2403469 A * 1/2005

* cited by examiner

*Primary Examiner*—Seung H Lee

(57) ABSTRACT

A card dispenser includes a dispenser body, which defines an accommodation chamber for receiving a stack of cards for dispensing, a conveying unit mounted in the dispenser body and controlled to deliver the loaded cards from the accommodation chamber through a delivery path to an output port individually, an adjustment structure for adjusting the length and width of the accommodation chamber subject to the size of the loaded cards, a mobile base member detachably inserted into the dispenser body and provided with an adjustment device for adjusting a gap of the delivery path subject to the thickness of the loaded cards in the accommodation chamber, and detection devices respectively mounted in the dispenser body and the mobile base member for detecting accurate dispensing of every card through the delivery path to the output port.

14 Claims, 14 Drawing Sheets

CARD DISPENSER HAVING A MOBILE SENSOR HOLDER BOX

BACKGROUND OF THE INVENTION

1. Field of the Invention

The present invention relates to automatic vending machines and more specifically, to a card dispenser for automatic vending machine, which has a mobile base member convenient for cleaning, repair or replacement.

2. Description of the Related Art

Following fast development of information technology, non-shop business has become popular. Nowadays, various automatic vending machines are used everywhere to sell different products without servicemen. These automatic vending machines bring convenience to consumers and create new marketing routes for the suppliers.

Further, an automatic vending machine has an exchanger on the inside for providing different products to the user after having received a bill. Following fast development of high technology, various advanced automatic vending machines such as ticket venders, bill exchangers, coin exchangers, and etc., have been continuously created and appeared in different public places or street corners. Different sizes of bill exchangers or card/ticket vending machines are respectively equipped with a different size of bill or card dispenser. Further, different specifications of bill or card dispensers may be prepared to fit different sizes of bills or cards. Preparing different specifications of bill or card dispensers in order to fit different sizes of bills or cards greatly increases the material and manufacturing cost as well the inventory cost.

Further, after a long use of a bill or card dispenser, the authentification device of the bill or card dispenser tends to be contaminated by the dirt carried on the dispensed bills or cards or covered with dust in air, thereby lowering the detection accuracy or resulting in an error action. Further, a bill or card dispenser may be unable to function normally when a wrinkled bill or card jammed in it. When the aforesaid conditions occurred, the bill or card dispenser the must be removed from the bill exchanger or card/ticket vending machine for a replacement or repair. However, because a number of screws are used to affix the bill or card dispenser to the housing of the bill exchanger or card/ticket vending machine, it is complicated to dismount the bill or card dispenser. During the dismounting work, the worker must pick up every unfastened screw carefully because the loss of one screw results uninstallability of the bill or card dispenser.

Therefore, it is desirable to provide a modularized card (or bill or ticket) dispenser that eliminates the aforesaid various drawbacks of the conventional designs.

SUMMARY OF THE INVENTION

The present invention has been accomplished under the circumstances in view. According to one aspect of the present invention, the card dispenser comprises a dispenser body, and a mobile base member detachably mounted in the dispenser body. The dispenser body has an accommodation chamber for receiving a stack of cards for dispensing, an output port, a delivery path in communication between the accommodation chamber and the output port, and a conveying unit controlled to deliver the loaded cards from the accommodation chamber through the delivery path to the output port individually. The mobile base member is detachably inserted into the dispenser body and provided with an adjustment device for adjusting a gap of the delivery path subject to the thickness of the loaded cards in the accommodation chamber. Further, detection devices are respectively mounted in the dispenser body and the mobile base member for detecting accurate dispensing of every card through the delivery path to the output port. After a long use of the card dispenser, the user can conveniently take the mobile base member out of the dispenser body for cleaning. When a wrinkled card is jammed in the delivery path, the user can take the mobile base member out of the dispenser body conveniently and then remove the jammed card.

According to another aspect of the present invention, an adjustment structure is provided in the dispenser body for adjusting the length and width of the accommodation chamber subject to the size of the cards loaded in the accommodation chamber.

According to still another aspect of the present invention, the mobile base member has an adjustment device for adjusting a gap of the delivery path of the dispenser body subject to the thickness of the cards to be dispensed.

DETAILED DESCRIPTION OF THE PREFERRED EMBODIMENT

Figure 1:
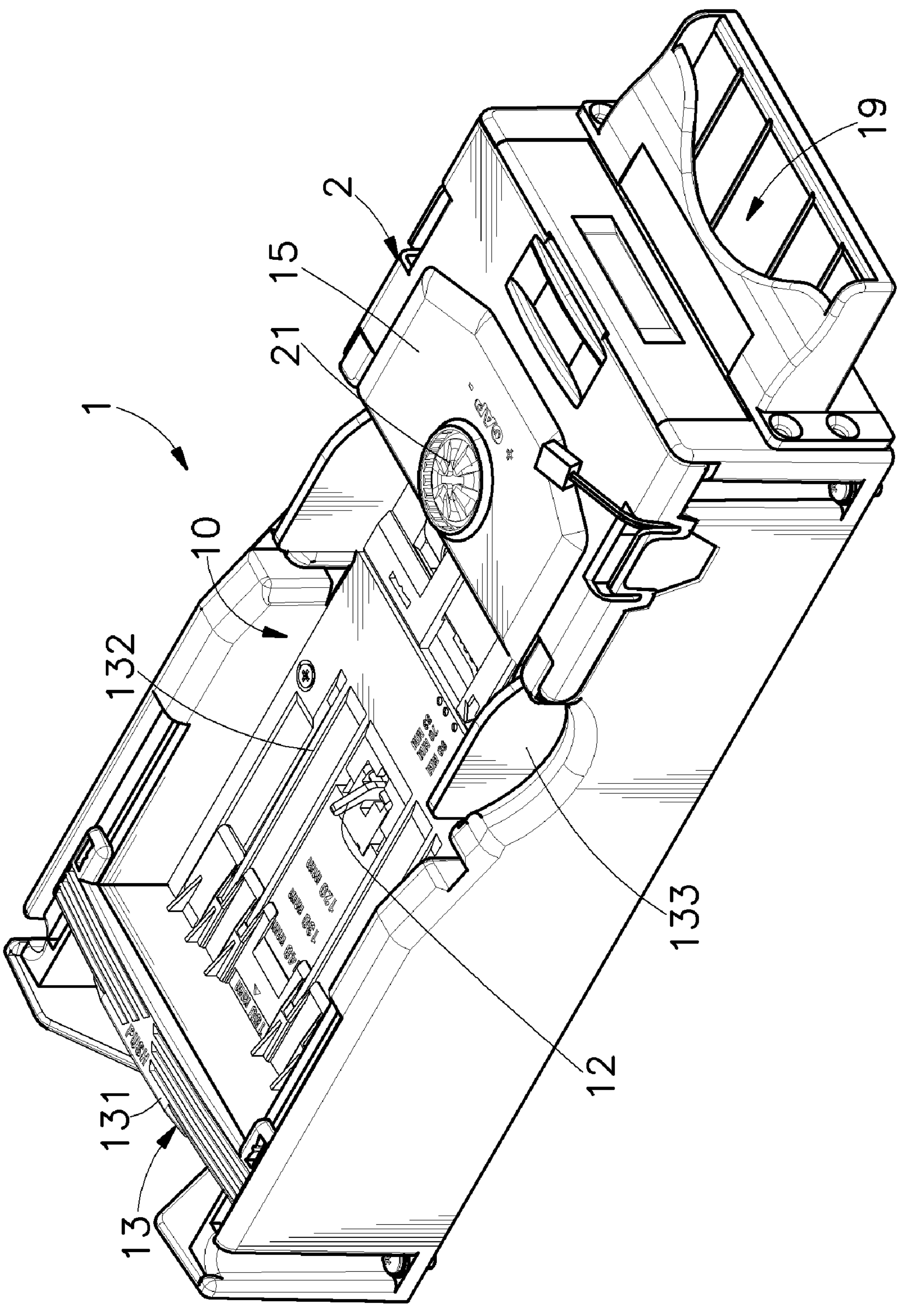
FIG. 1 is a perspective view of a card dispenser in accordance with the present invention.
Figure 2:
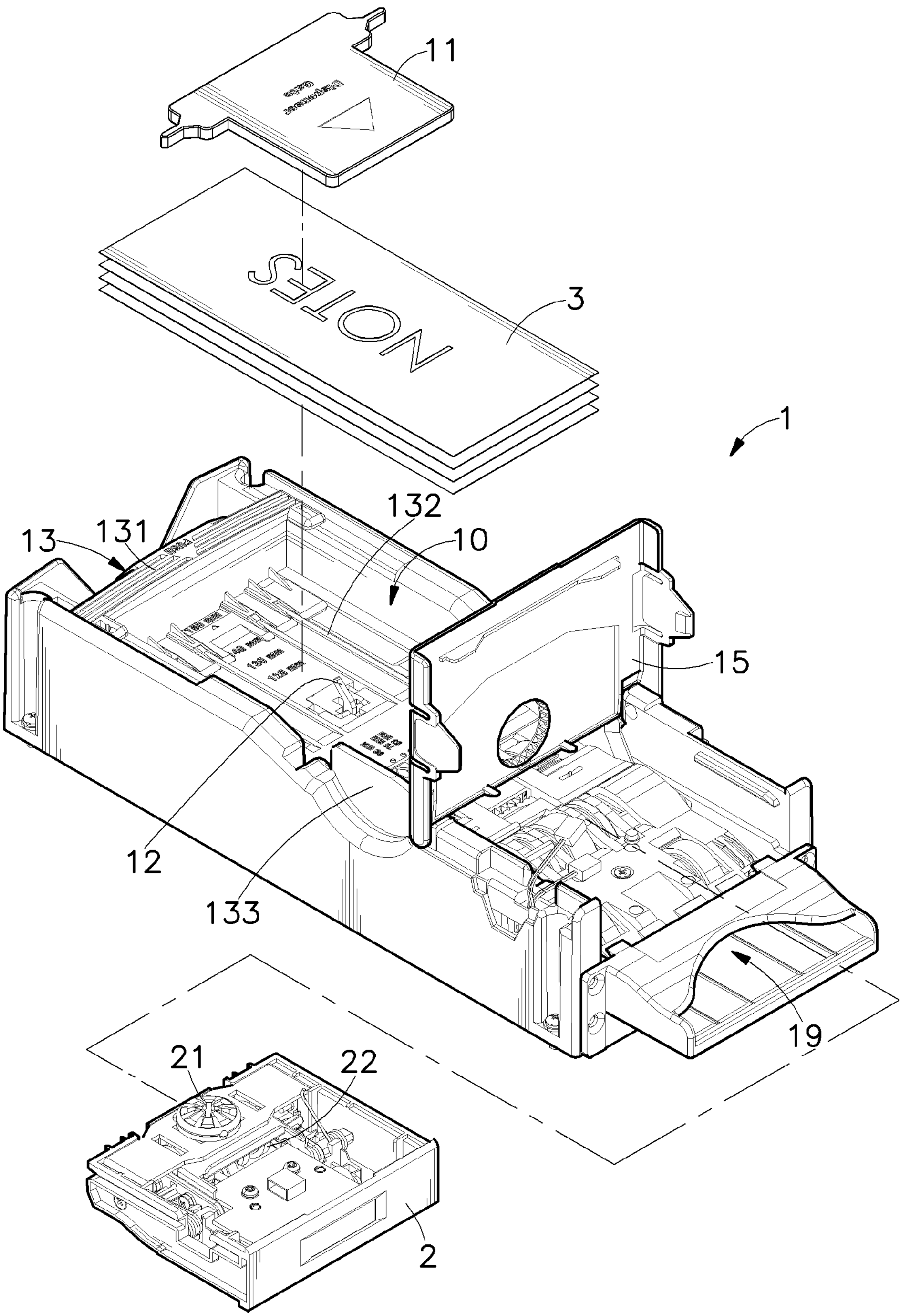
FIG. 2 is an exploded view of the card dispenser according to the present invention.
Figure 2A:
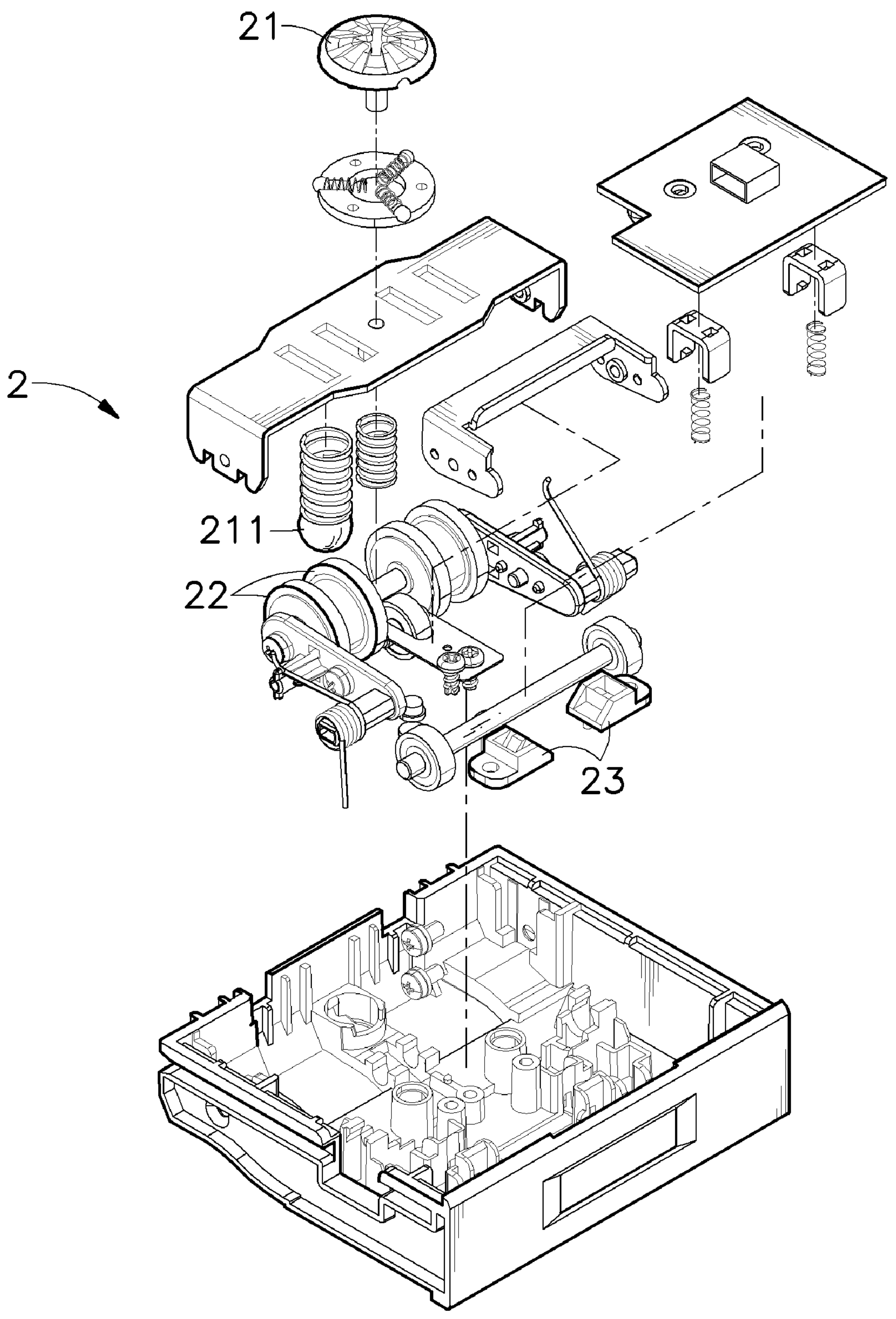
FIG. 2A is an exploded view of the mobile base member of the card dispenser according to the present invention.
Figure 2B:
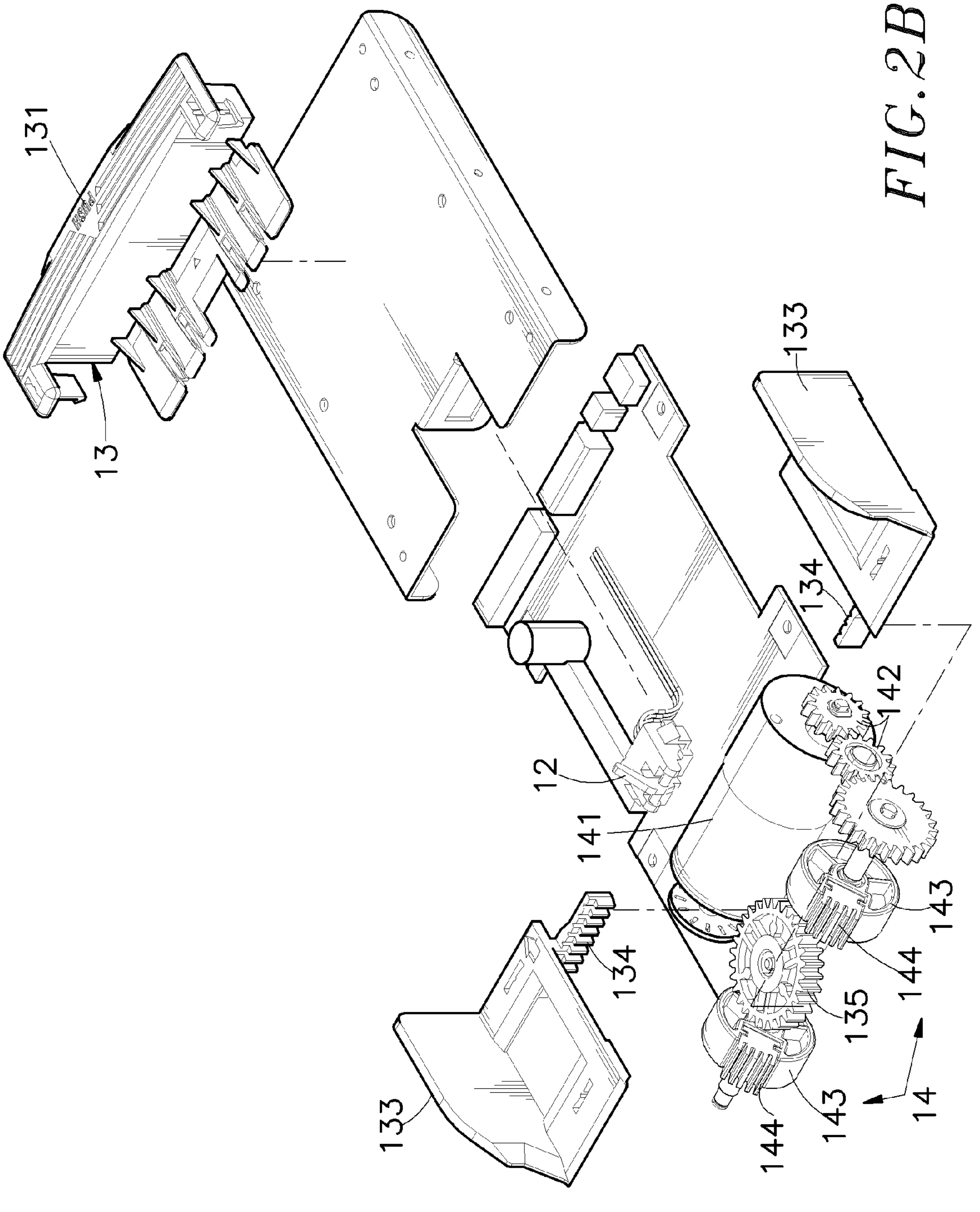
FIG. 2B is an exploded view of the dispenser body of the card dispenser according to the present invention.
Figure 2C:
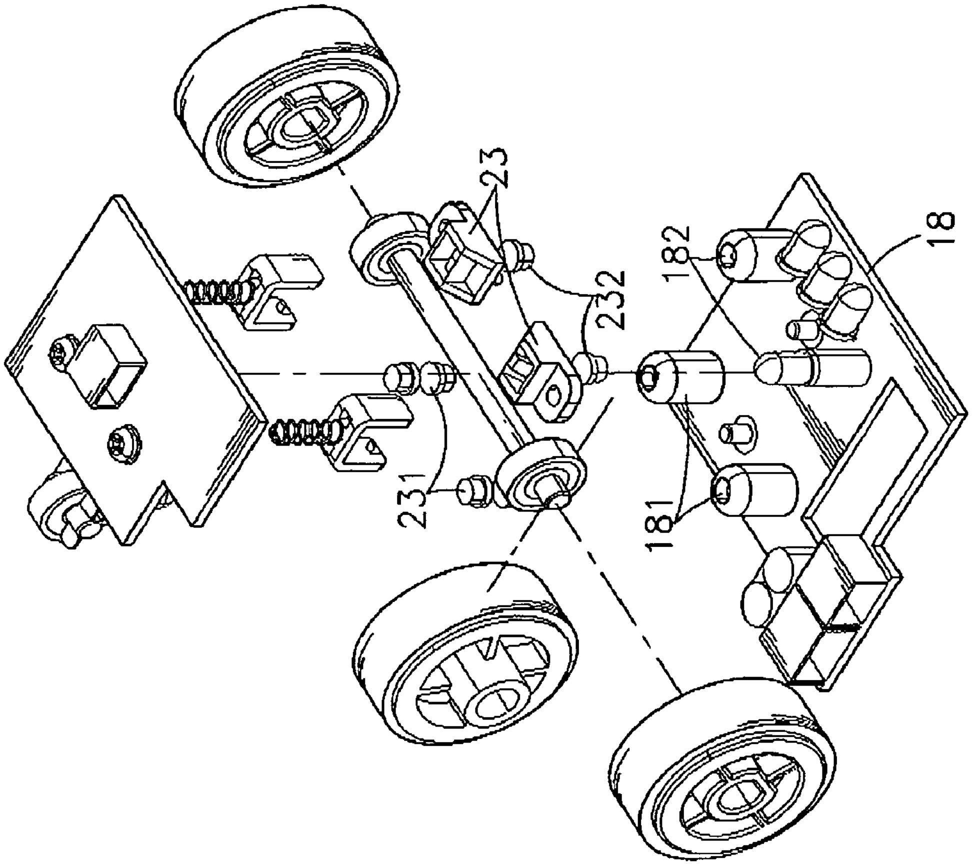
FIG. 2C is an exploded view of a part of the card dispenser according to the present invention, showing the structure of the detection device of the mobile base member and the detection device of the dispenser body.

Referring to FIGS. 1, 2, 2A, 2B, 2C, and 3A, a card dispenser in accordance with the present invention is shown comprised of a dispenser body 1 and a mobile base member 2.

The dispenser body 1 has an accommodation chamber 10 adapted to accommodate cards (or tickets or notes) 3, a pressure board 11 for holding down cards 3 in the accommodation chamber 10, a card sensor 12 mounted inside the accommodation chamber 10 and adapted to detect the presence of card or cards 3, an adjustment structure 13 adapted to adjust the length and width of the accommodation chamber 10 subject to the size of the cards 3 to be received, a conveying unit 14 provided in the accommodation chamber 10 at one side, a cover plate 15 provided in the accommodation chamber 10 adjacent to the conveying unit 14, a delivery path 16 defined in the accommodation chamber 10 at one side, at least one roller 17 and one detection device 18 (see FIG. 3A) arranged in the delivery path 16. The conveying unit 14 comprises a motor 141, a transmission gear set 142, and a plurality of wheels 143. The wheels 143 each have a push block 144 fixedly provided at the periphery. The detection device 18 comprises first lenses 181 and second lenses 182. The delivery path 16 has an output port 19.

The mobile base member 2 comprises an adjustment device 21, which has a press portion 211 for pressing on the roller 17 in the delivery path 16 to adjust a gap of the delivery path 16, two actuating wheels 22 arranged in parallel at two sides, and a detection device 23. The detection device 23 comprises a first sensor 231 corresponding to the first lens 181, and a second sensor 232 corresponding to the second lens 182.

Figure 3A:
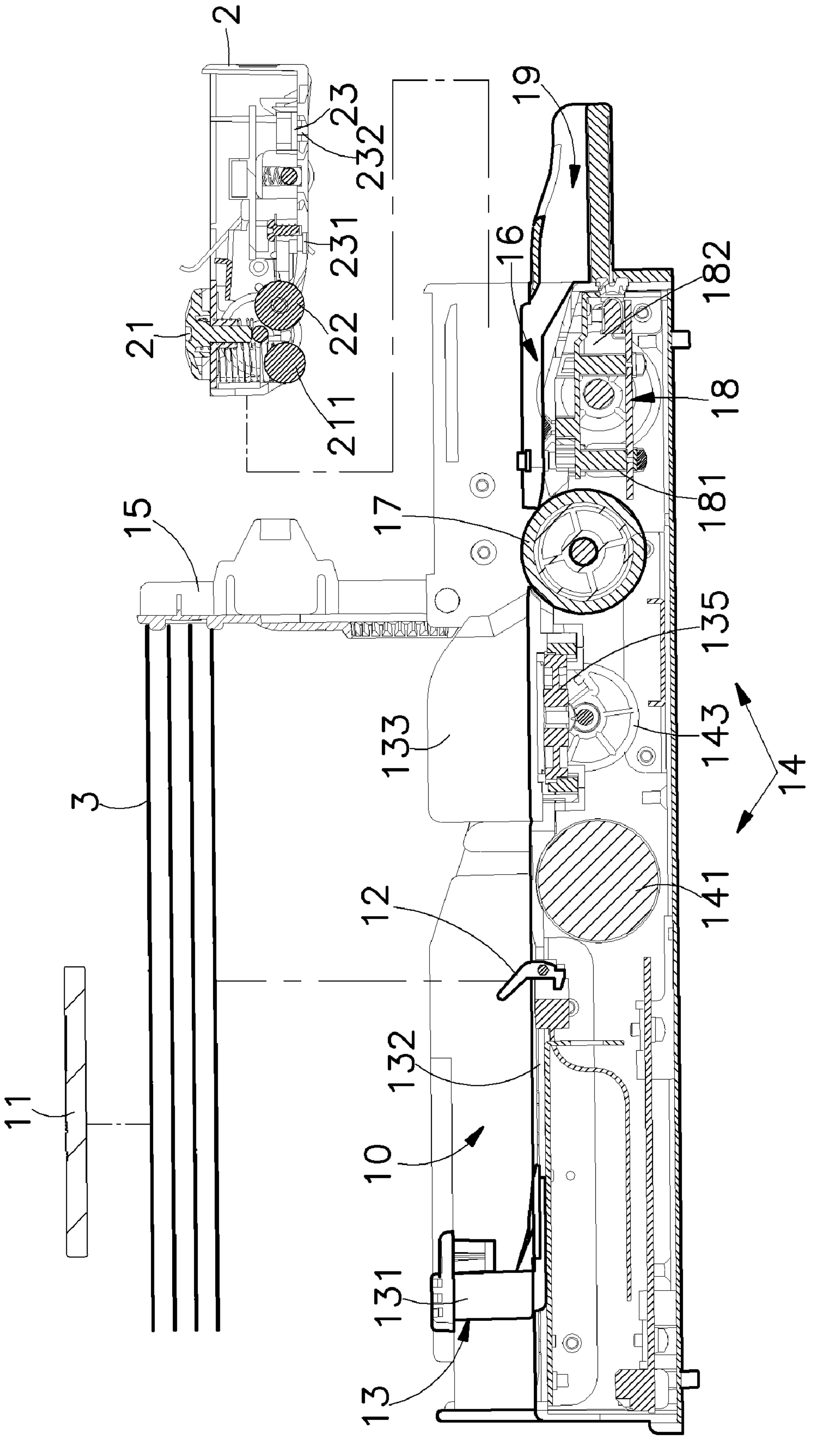
FIG. 3A is a schematic sectional view of the card dispenser according to the present invention (I).
Figure 3B:
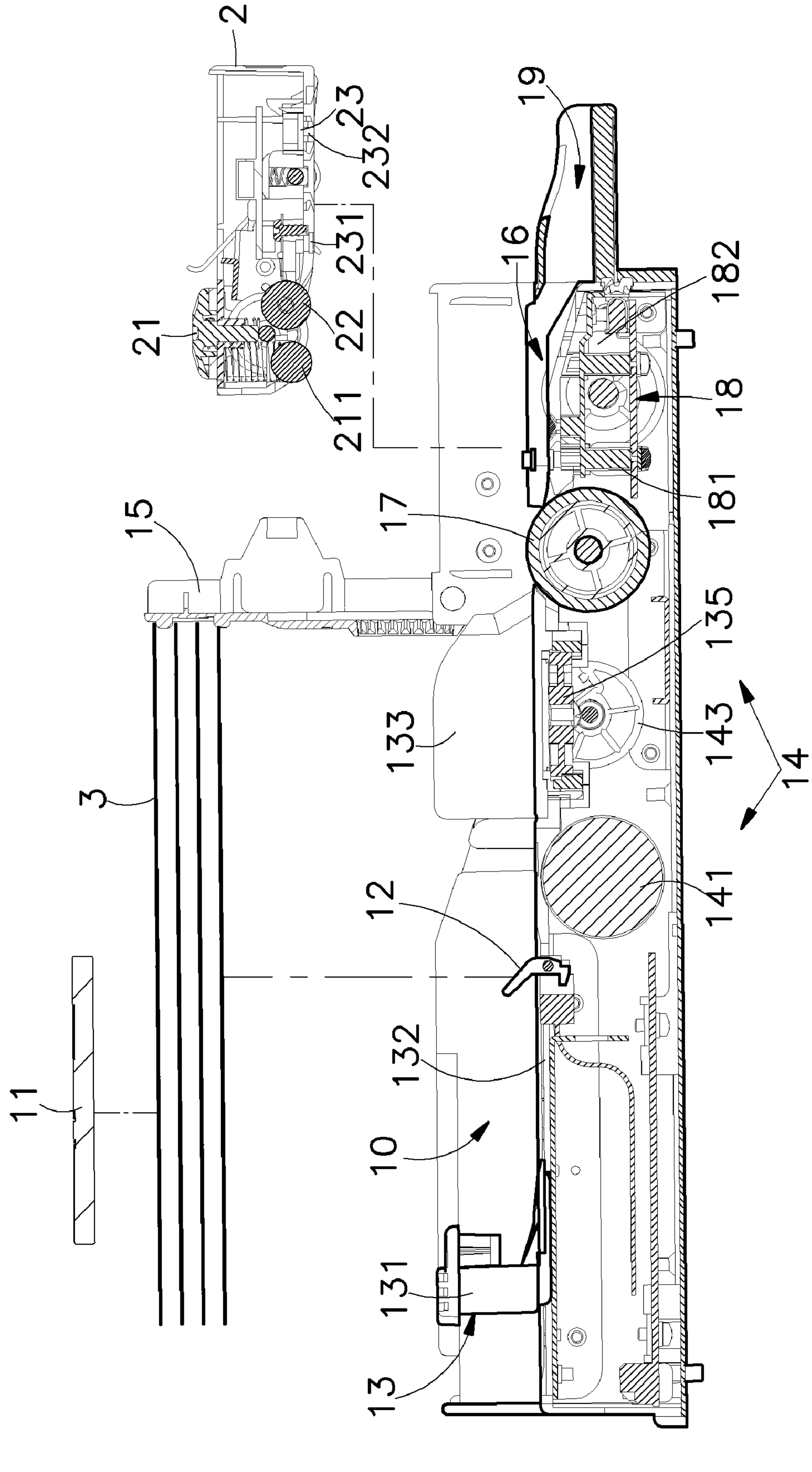
FIG. 3B is a schematic sectional view of the card dispenser according to the present invention (II).
Figure 4:
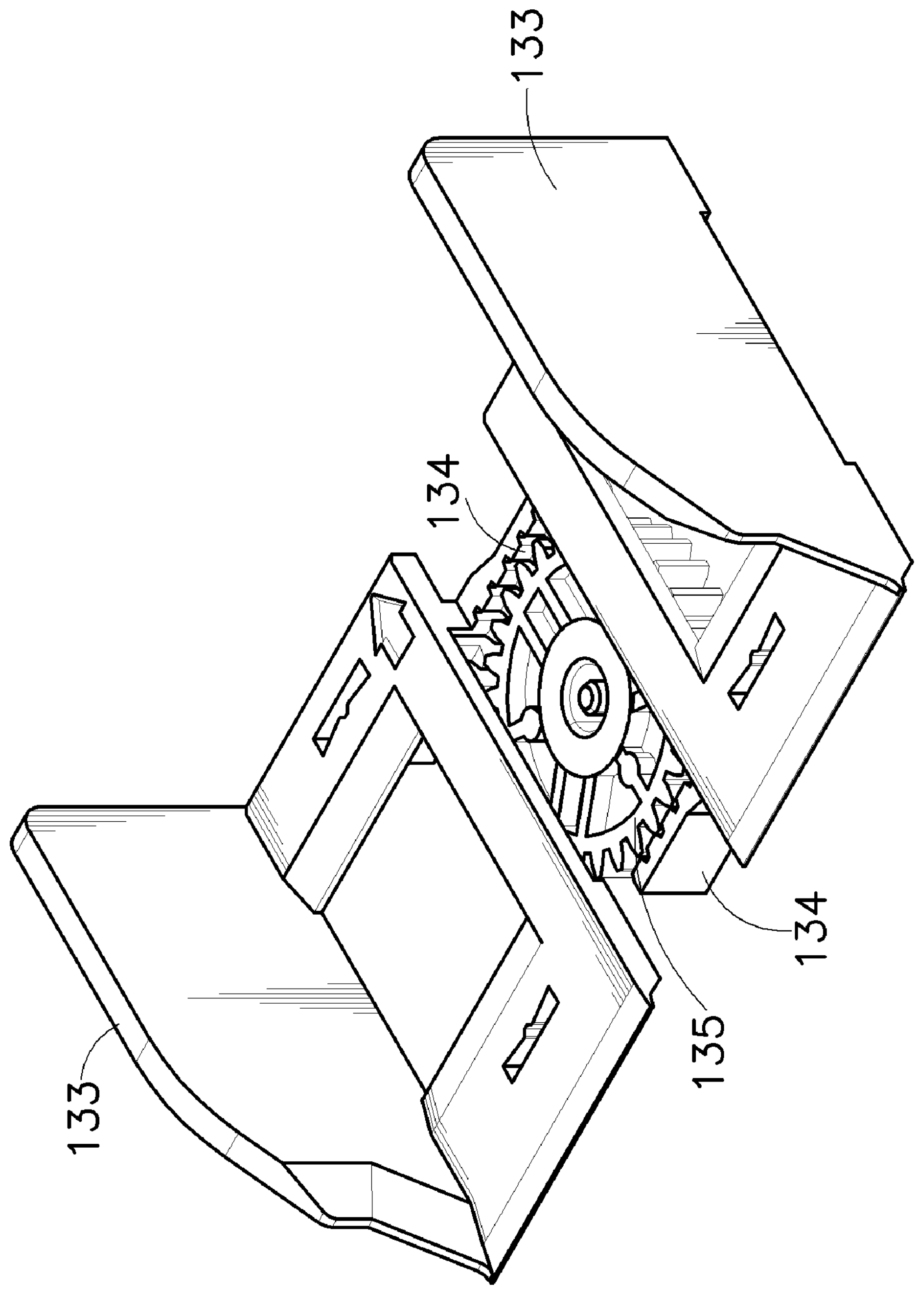
FIG. 4 is an elevational view of the adjustment structure of the dispenser body of the card dispenser according to the present invention.
Figure 4A:
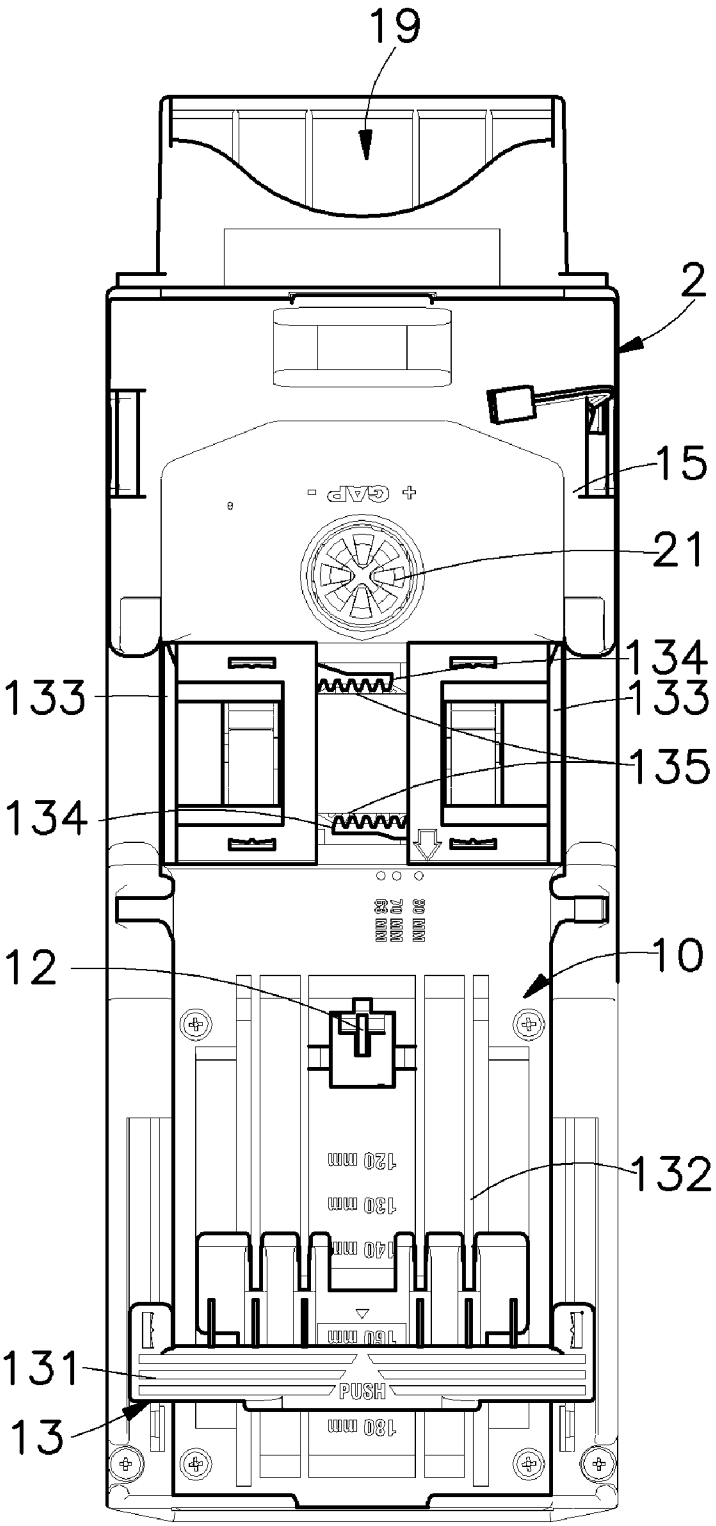
FIG. 4A is a schematic drawing showing the adjustment of the accommodation chamber according to the present invention (I).
Figure 4B:
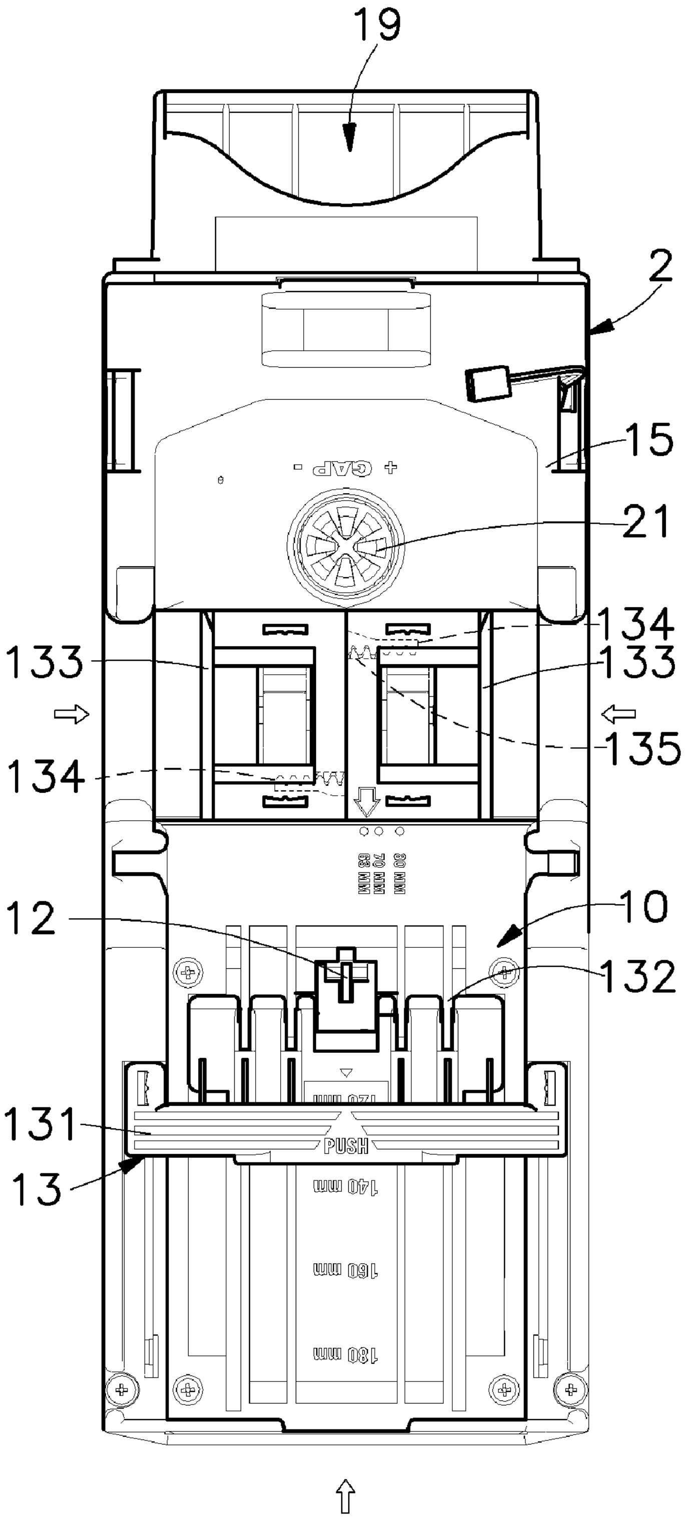
FIG. 4B is a schematic drawing showing the adjustment of the accommodation chamber according to the present invention (II).
Figure 5A:
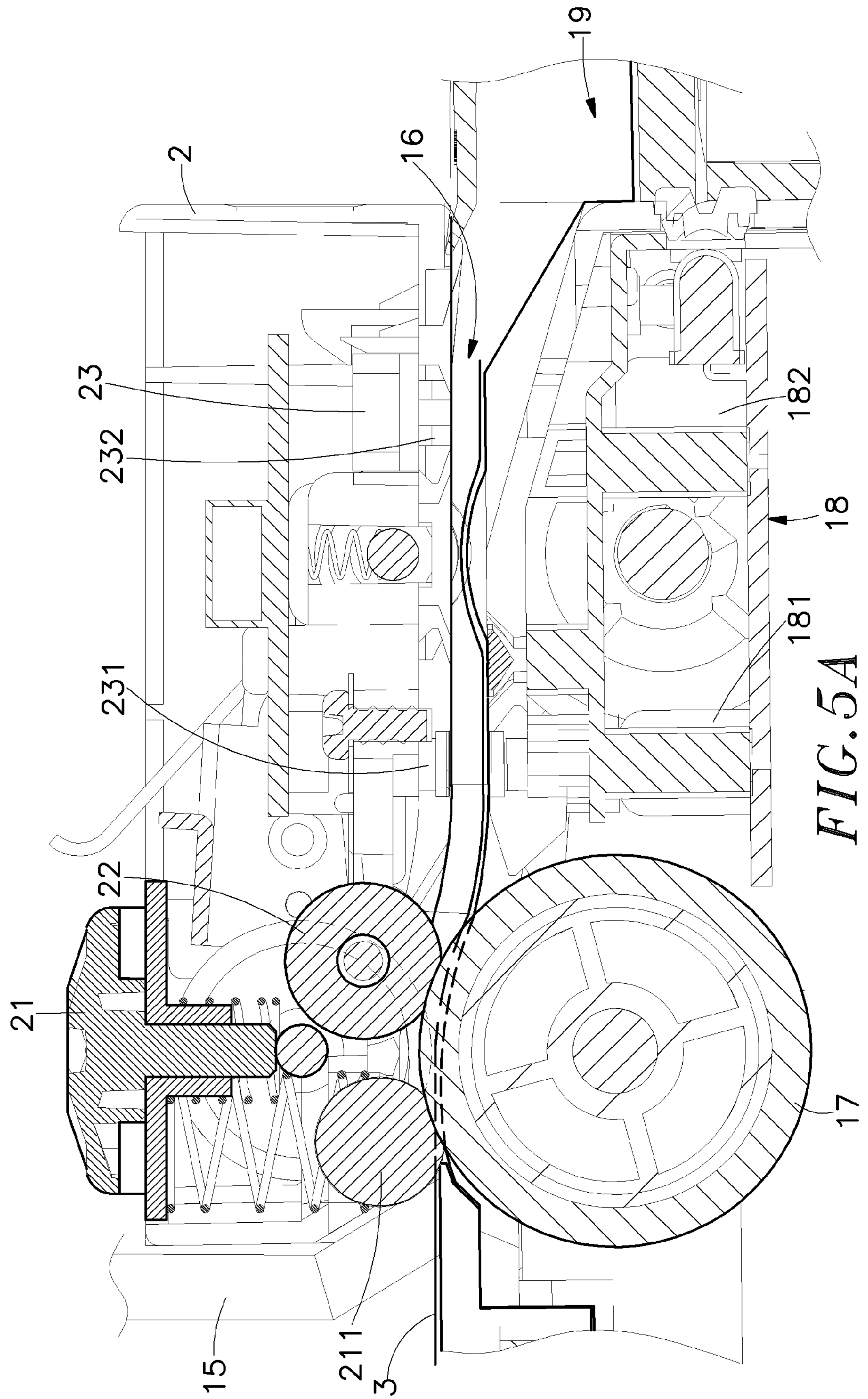
FIG. 5A is a schematic sectional view showing the adjustment of the gap of the delivery path according to the present invention (I).
Figure 5B:
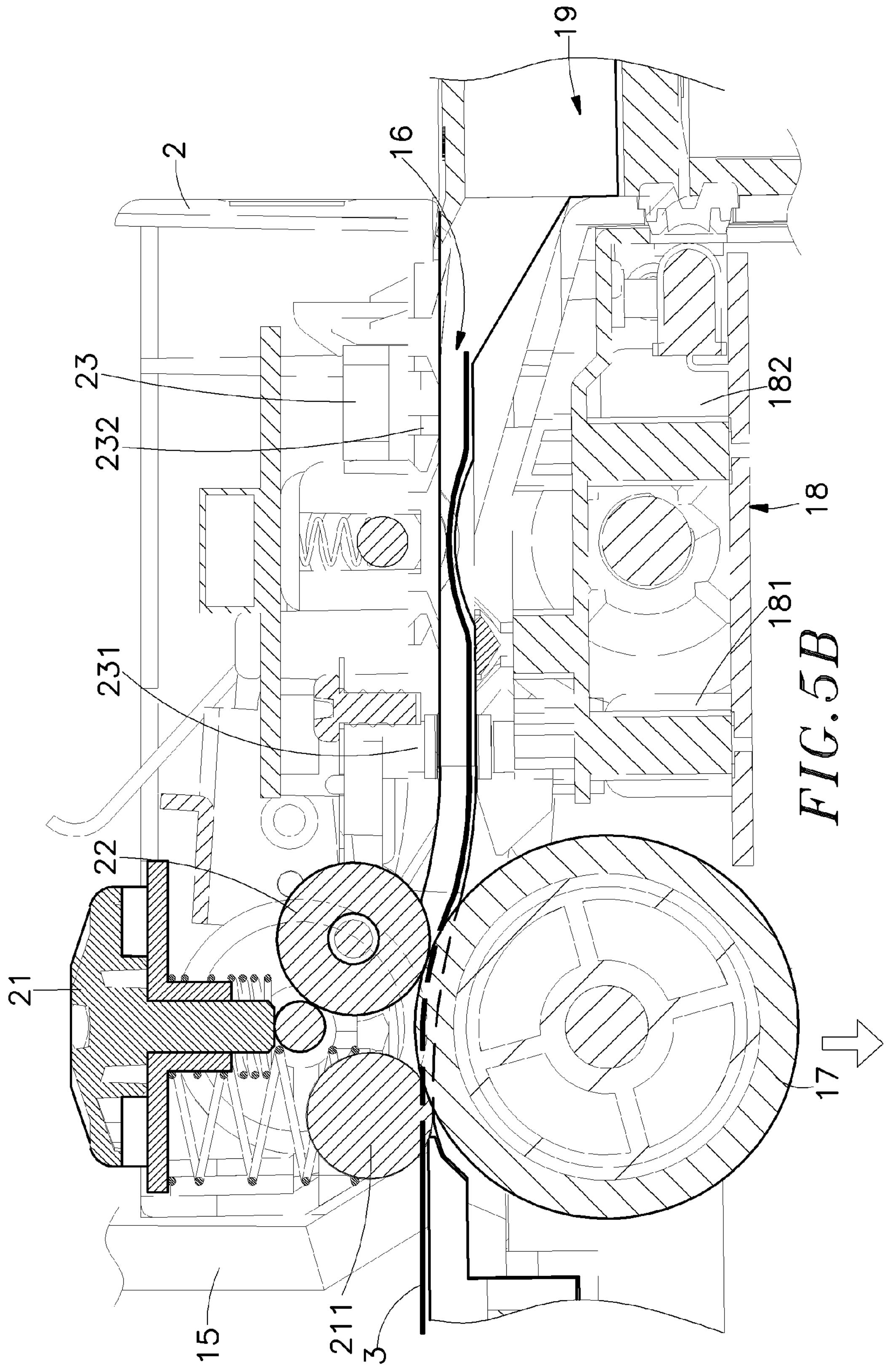
FIG. 5B is a schematic sectional view showing the adjustment of the gap of the delivery path according to the present invention (I).
Figure 6A:
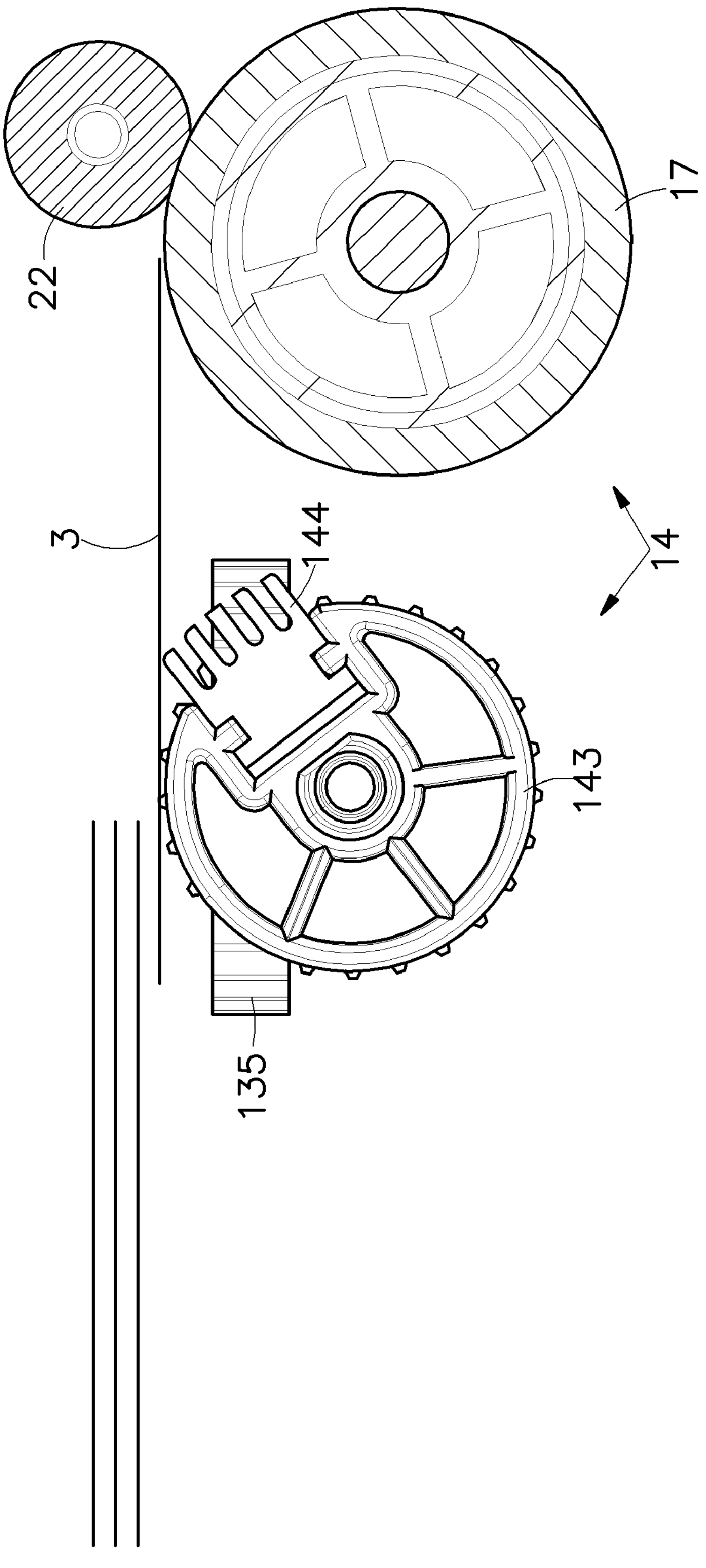
FIG. 6A is a schematic sectional view showing the card delivery action of the card dispenser according to the present invention (I).
Figure 6B:
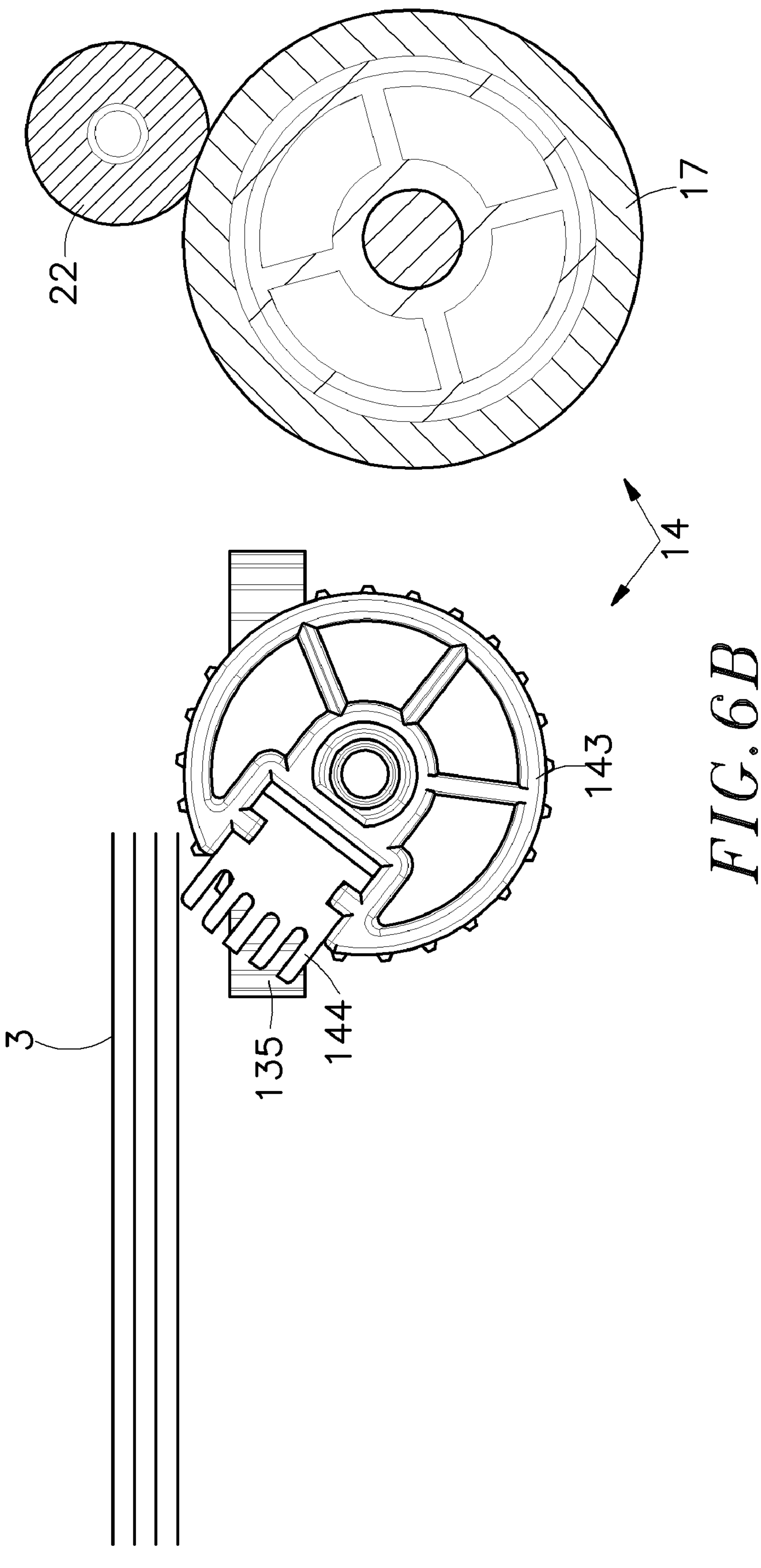
FIG. 6B is a schematic sectional view showing the card delivery action of the card dispenser according to the present invention (II).

Referring to FIGS. 1, 3A and 3B, the mobile base member 2 can be inserted into the dispenser body 1 or pulled out of the dispenser body 1 in horizontal direction. Alternatively, the mobile base member 2 can be inserted into the dispenser body 1 or pulled out of the dispenser body 1 in vertical direction. After insertion of the mobile base member 2 into the dispenser body 1, the cover plate 15 is covered on the mobile base member 2. When one card 3 is wrinkled and jammed in the card dispenser, the user can directly and conveniently remove the mobile base member 2 out of the dispenser body 1 to eliminate the trouble. Further, the mobile base member 2 failed, the user can also directly and conveniently remove the mobile base member 2 out of the dispenser body 1 for repair or replacement.

Referring to FIGS. 2B, 4, 4A and 4B, the adjustment structure 13 comprises a track 132 fixedly mounted inside the accommodation chamber 10, a length adjustment plate member 131 mounted on the track 132 and movable along the track 132 to adjust the length of the accommodation chamber 10 subject to the length of the cards 3 to be received, at least one, for example, two width adjustment plate members 133 arranged at two opposite lateral sides, each width adjustment plate member 133 having a rack 134, and a driving gear 135 meshed with the rack 134 of each width adjustment plate member 133. When rotating the driving gear 135, each width adjustment plate member 133 is moved with the respective rack 134, and therefore the width of the accommodation chamber 10 is relatively adjusted. After loading of a stack of cards 3 in the accommodation chamber 10, the gap of the delivery path 16 is adjusted subject to the thickness of the cards 3 so that the cards 3 can be individually and smoothly delivered through the delivery path 16 out of the output port 19. Further, the adjustment structure 13 can be made having both the length adjustment plate member 131 and the width adjustment plate members 13. Alternatively, the adjustment structure 13 can be made having only the length adjustment plate member 131 or the width adjustment plate member 13. Two width adjustment plate member 13 may be used and arranged at two sides for adjusting the width of the accommodation chamber 10. Alternatively, the adjustment structure 13 can be made using only one width adjustment plate member 13 for adjusting the width of the accommodation chamber 10 to fit different sizes of cards 3. Therefore, the invention eliminates the drawback of the prior art design that accommodates only one particular side of cards.

Referring to FIGS. 2, 3A, 3B, 5A and 5B, when accommodating a different thickness of cards 3 in the accommodation chamber 10, the gap of the delivery path 16 must be properly adjusted so that the loaded cards 3 can be individually delivered to the output port 19. When making an adjustment on the gap of the delivery path 16, rotate the adjustment device 21 to press the press portion 211 against the roller 17 in the delivery path 16 and to further control the gap of the delivery path 16. By means of rotating the adjustment device 21 to control the pressure of the press portion 211 against the roller 17, the gap of the delivery path 16 is relatively adjusted.

Referring to FIGS. 2C, 3A, 3B, 6A and 6B, after loading of a stack of cards 3 in the accommodation chamber 10 of the dispenser body 1, the card sensor 12 is induced by the cards 3 to output a signal to the control circuit of the automatic vending machine (not shown) so that the control circuit of the automatic vending machine can control the card dispenser to dispense cards. When starting a card dispensing operation, the motor 141 is driven to rotate the transmission gear set 142 and the wheels 143, thereby causing the push blocks 144 of the wheels 143 to touch the cards 3 and to further push the cards 3 toward the actuating wheels 22. When the cards 3 touched the actuating wheels 22, the cards 3 are forced by the actuating wheels 22 into a stepped status, for enabling the push blocks 144 of the wheels 143 to push the lowest card 3 into the delivery path 16 toward the output port 19 of the dispenser body 1. When the card 3 is pushed out of the output port 19 of the dispenser body 1, the first sensor 231 and the first lens 181 detect the dispensing number of card 3; the second sensor 232 and the second lens 182 detect completion of the dispensing work. After dispensing of the card 3, the second sensor 232 outputs a signal indicative of the completion of the dispensing work. Therefore, the card dispenser accurately sends out the cards 3 through the output port 19 without causing a loss to the user.

Further, the aforesaid adjustment device 21 can be an adjustment screw or control valve that matches with the roller 17 to control the gap of the delivery path 16 subject to the thickness of the cards 3 so that the cards 3 can be individually and accurately delivered out of the output port 19. Further, the cards 3 can be any of a variety of valuable notes, sports player cards, game cards, telephone cards, valuable or invaluable cards, or the like.

As indicated above, the invention provides a card dispenser that has the following benefits:

1. The user can conveniently remove the mobile base member 2 from the dispenser body 1 for cleaning, preventing a detection failure due to accumulation of dirt. When a wrinkled card 3 is jammed in the card dispenser, the user can take the mobile base member 2 out of the dispenser body 1 to eliminate the trouble. Further, the user can conveniently remove the mobile base member 2 from the dispenser body 1 for a replacement or repair work.

2. By means of the adjustment structure 13, the user can adjust the length and width of the accommodation chamber 10 to fit different types of cards 3.

3. By means of adjusting the pressure of the press portion 211 of the adjustment device 21 against the roller 17 in the delivery path 16, the gap of the delivery path 16 is adjusted to fit different thickness of cards 3, enabling the loaded cards 3 to be accurately and individually delivered out of the output port 19.

4. Detection devices 18 and 23 are respectively provided in the dispenser body 1 and the mobile base member 2 to detect the number of the card 3 being delivered through the delivery path 16 and to detect the completion of the delivery of every card 3, assuring accurate dispensing of the card dispenser and preventing any loss to the user.

A prototype of card dispenser has been constructed with the features of FIGS. 1~6. The card dispenser functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A card dispenser comprising a dispenser body, said dispenser body having an accommodation chamber adapted to accommodate piece members in a stack, an output port, a delivery path extending from one side of said accommodation chamber to said output port, and a conveying unit adapted to deliver the loaded piece members from said accommodation chamber through said delivery path to said output port individually, wherein the card dispenser further comprises a mobile base member detachably inserted into said dispenser body, said mobile base member having adjustment means adapted to adjust a gap of said delivery path subject to the thickness of the loaded piece members, sensor means installed in said dispenser body and said mobile base member and adapted to detect dispensing of the loaded piece members through said delivery path.

2. The card dispenser as claimed in claim 1, wherein said piece members are at least one of the kinds of bills, security notes, tickets and cards.

3. The card dispenser as claimed in claim 1, wherein said conveying unit comprises a motor, a transmission gear set coupled to and rotatable by said motor, at least one wheel respectively coupled and rotatable by said transmission gear set, said at least one wheel each having a push block at the periphery thereof.

4. The card dispenser as claimed in claim 1, wherein said adjustment means is an adjustment screw or a control valve.

5. The card dispenser as claimed in claim 1, wherein said adjustment means is adapted to adjust the pressure to a roller of said dispenser body in said delivery path and to further adjust the gap of said delivery path.

6. The card dispenser as claimed in claim 1, wherein said sensor means detect the number of the piece member passing through said delivery path.

7. The card dispenser as claimed in claim 1, wherein said sensor means outputs a signal upon delivery of one piece member out of said output port.

8. The card dispenser as claimed in claim 1, further comprising card sensor means mounted in said accommodation chamber of said dispenser body and adapted to detect the presence of said piece member in said accommodation chamber.

9. The card dispenser as claimed in claim 1, wherein said dispenser body comprises a pressure board adapted to hold down the loaded piece members in said accommodation chamber.

10. The card dispenser as claimed in claim 1, wherein said dispenser body comprises an adjustment means adapted to adjust the size of said accommodation chamber.

11. The card dispenser as claimed in claim 10, wherein said adjustment means comprises a track and a length adjustment plate member mounted on said track and movable along said track to adjust the length of said accommodation chamber.

12. The card dispenser as claimed in claim 10, wherein said adjustment means comprises at least one width adjustment plate member adapted to adjust the width of said accommodation chamber.

13. The card dispenser as claimed in claim 10, wherein said adjustment means comprises a length adjustment plate member adapted to adjust the length of said accommodation chamber, and at least one width adjustment plate member adapted to adjust the width of said accommodation chamber.

14. The card dispenser as claimed in claim 1, wherein said dispenser body comprises a cover plate adapted to cover said mobile base member.

* * * * *